United States Patent [19]

Ekman

[11] 4,005,634
[45] Feb. 1, 1977

[54] METHOD AND APPARATUS FOR RAISING A COLLAPSIBLE SCREEN MOUNTED ON A VEHICLE SUCH AS A TANK

[75] Inventor: Curt Olof Ekman, Karlskoga, Sweden

[73] Assignee: AB Bofors, Bofors, Sweden

[22] Filed: Dec. 13, 1974

[21] Appl. No.: 532,580

[30] Foreign Application Priority Data

Dec. 20, 1973 Sweden ............................ 7317183

[52] U.S. Cl. ............................................... 89/36 H
[51] Int. Cl.² ........................................... F41H 5/00
[58] Field of Search ............... 89/36 H, 36 K, 40 C; 52/63, 66

[56] References Cited

UNITED STATES PATENTS

| | | | |
|---|---|---|---|
| 2,384,646 | 9/1945 | Schwab | 89/36 H X |
| 2,625,859 | 1/1953 | Dandini | 89/36 H |
| 2,898,810 | 8/1959 | Even | 89/36 H |
| 3,137,205 | 6/1964 | Berge et al. | 89/36 H |
| 3,139,797 | 7/1964 | Fair et al. | 89/36 H |
| 3,160,435 | 12/1964 | Smith | 52/63 X |
| 3,765,301 | 10/1973 | Pagano et al. | 89/36 H |
| 3,848,508 | 11/1974 | Bullinger | 89/36 H |

Primary Examiner—David H. Brown
Attorney, Agent, or Firm—Pollock, Vande Sande & Priddy

[57] ABSTRACT

Method and apparatus for selectively raising and lowering a collapsible screen normally stored in collapsed fashion in a storage channel extending around the periphery of the upper surface of a tank supporting a gun barrel. A rigid frame is secured to the screen and is detachably connectable at one end thereof to the gun barrel. As the barrel is raised, the frame is raised at its forward end so as to raise the forward portion of the screen. Stays are then pivotably mounted on each side of the frame adjacent its mid points. Thereafter, when the barrel is depressed, the frame is pivoted about those first, auxiliary stays to thereby elevate the rear portion of the frame. An additional set of stays can now be inserted to support the rear end of the frame. Finally, the front end of the frame can again be elevated by raising the barrel with further stays supporting such front end of the frame.

5 Claims, 10 Drawing Figures

METHOD AND APPARATUS FOR RAISING A COLLAPSIBLE SCREEN MOUNTED ON A VEHICLE SUCH AS A TANK

BACKGROUND OF THE INVENTION

The present invention relates to a method, and apparatus for elevating, and stretching a collapsible screen, provided with a stiffening upper frame, which screen is supported on a vehicle such as a tank having a gun barrel or the like.

A collapsible screen which can be raised is utilized, for tanks which at their upper parts are provided with a storage space for the screen which attends around the vehicle. The collapsible screen can temporarily be raised when, from its stored position when the tank is to be moved in or upon water so that it becomes desirable to increase the displacement of The collapsible screen, which usually is made with a rectangular cross section with dimensions of 10 × 5 meters, has a height of 1 or a few meters in its raised position, and the cloth in the screen, which is waterproof, can have a thickness of 0.5 – 5.0 mm. A collapsible screen which is suitable for use with the present invention is described in the Swedish Pat. No. 226.690.

Because at the large dimensions of the collapsible screen, problems may be encountered in achieving rapid and efficient raising of the screen when using prior art methods and apparatus. The raising also is often made in are difficult due to the fact that it must often be carried out under extremely poor light and weather conditions.

SUMMARY OF THE INVENTION

The present invention is primarily intended to solve these problems. According to the invention, a member secured to the barrel engages with a device on a front part of the frame which supports the screen when it is raised. As the barrel is raised, the front part of the screen is raised as well and then is held in this raised position two first stays are placed in between supporting surfaces located on the vehicle and the frame at the central parts of the frame. The frame pivotably on said first stays so that, as the barrel is lowered, the rear portion of the frame with its attached screen portion is now raised. Thereafter, second stays are placed inbetween the supporting surfaces on the vehicle and the rear part of the frame. Then the front parts of the frame are raised anew by means of the barrel by once again raising the barrel in order to make it possible to place third stays between supporting surfaces and the frame at the front parts of the frame.

BRIEF DESCRIPTION OF THE DRAWINGS

An embodiment of the invention will be described with reference to the accompanying drawings, wherein.

Figure 1:
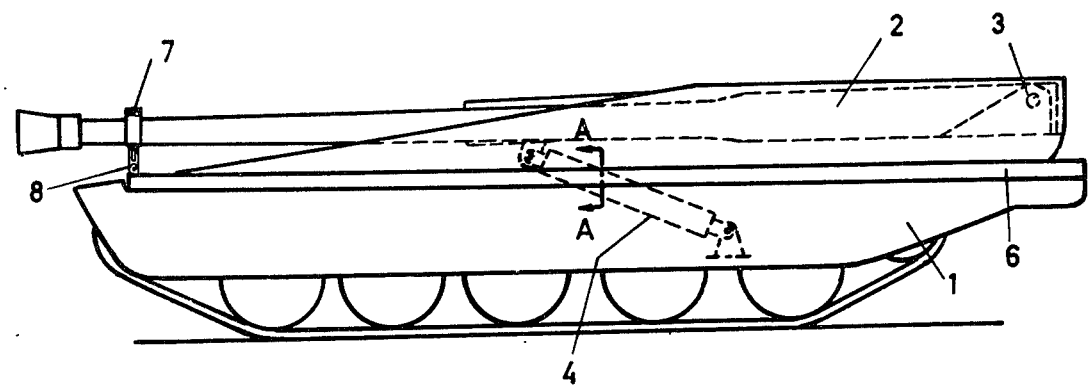
FIG. 1 is a side view of a tank provided with a collapsible screen utilizing the invention.

Parts corresponding to each other in the drawings have been given the same reference designations.

DETAILED DESCRIPTION OF THE PREFERRED EMBODIMENT

In the drawings numeral 1 designates a tank supporting a large-bore firearm 2, which is suspended at its rear parts in symbolically indicated trunnions 3 so that it can be elevated. The elevation takes place by means of one or several hydraulic pistons 4 which, to achieve the desired barrel elevation, are controlled in a way known in the art. Traversing of the firearm is carried out by aiming the entire vehicle in traverse.

Around its upper parts, the vehicle is provided with a storage space 5 for a collapsible screen which, when not being used is folded up in the space in a conventional way. The storage space for the screen is formed by a platform 9' extending around the vehicle and a substantially L-formed upper frame 6 which in the retracted position of the screen rests against the upper surface of the platform, as well as against a side surface of the vehicle formed at the platform, whereby the limiting walls of the storage space 5 consist of the inner walls of the upper frame 6, the upper surface of the platform 9' and said side surface of the vehicle. The screen is fastened in a watertight manner to both the frame and the platform.

Figure 2:
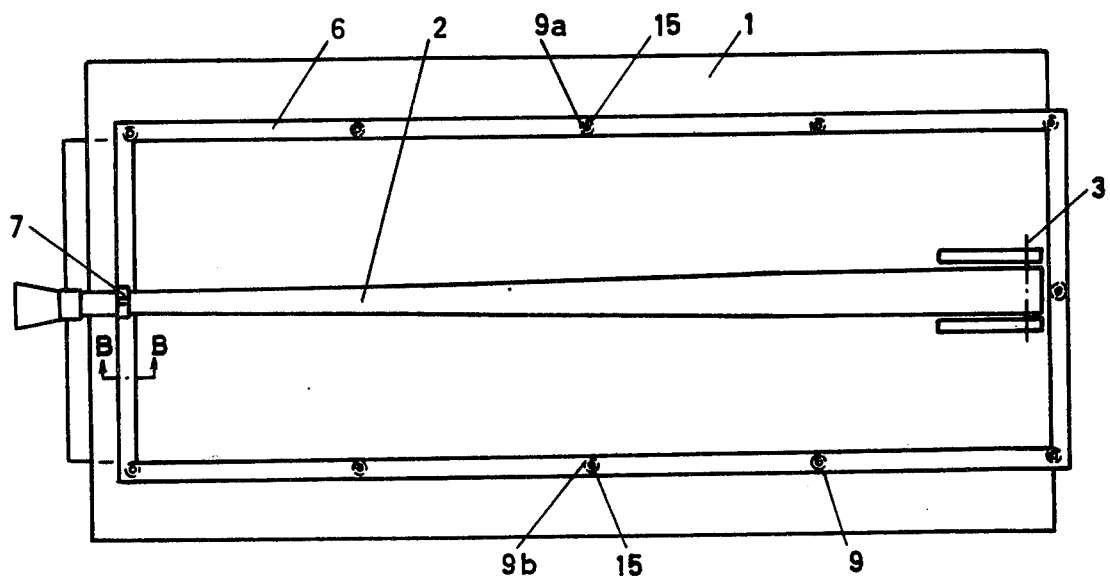
FIG. 2 is a plan view of the tank according to FIG. 1.

The storage space, the screen and said upper frame 6 extend around the vehicle and, in accordance with FIG. 2, have a substantially rectangular cross section. At its section which is located over the front end of the frame, and over the front parts of the screen, the barrel 2 supports a member 7 which engages a device 8 connected to the front end of the frame, which member 7 and device 8 will later be described in more detail. On the platform, along its periphery, a number of supporting surfaces 9 are formed for stays which are placed inbetween the supporting surfaces and the frame when the screen is extended. In the embodiment shown, a supporting surface at each corner of the frame is used for this, as well as three additional supporting surfaces along each side and one supporting surface at each end. The supporting surfaces along the sides are equally spaced. The number of supporting surfaces is of no importance for the invention per se, but can be varied as desired.

Figure 3A:
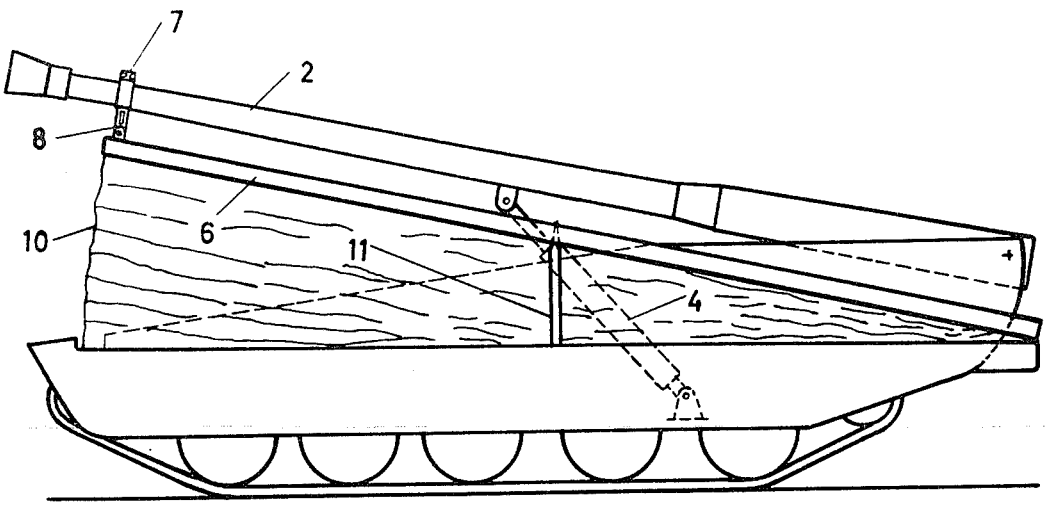
FIGS. 3 a–3c are side views of the tank according to FIGS. 1 and 2 show various stages of the raising of the screen.
Figure 3B:
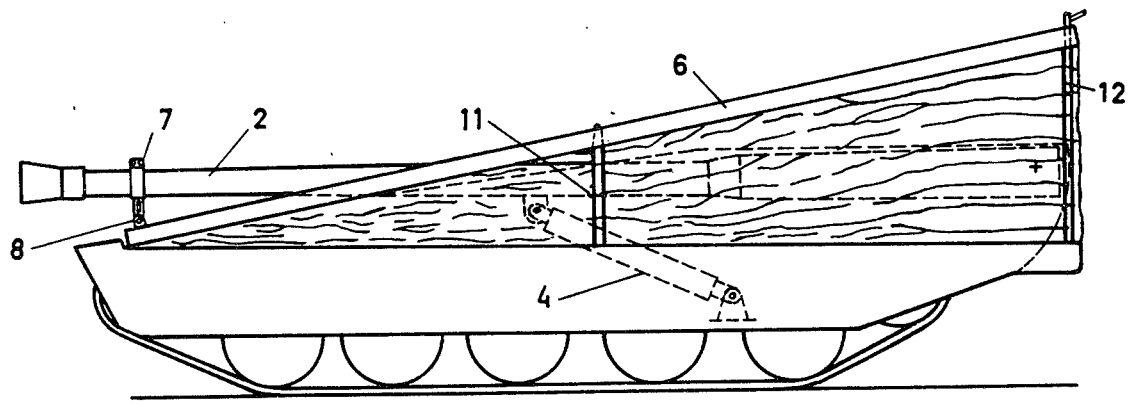
Figure 3C:
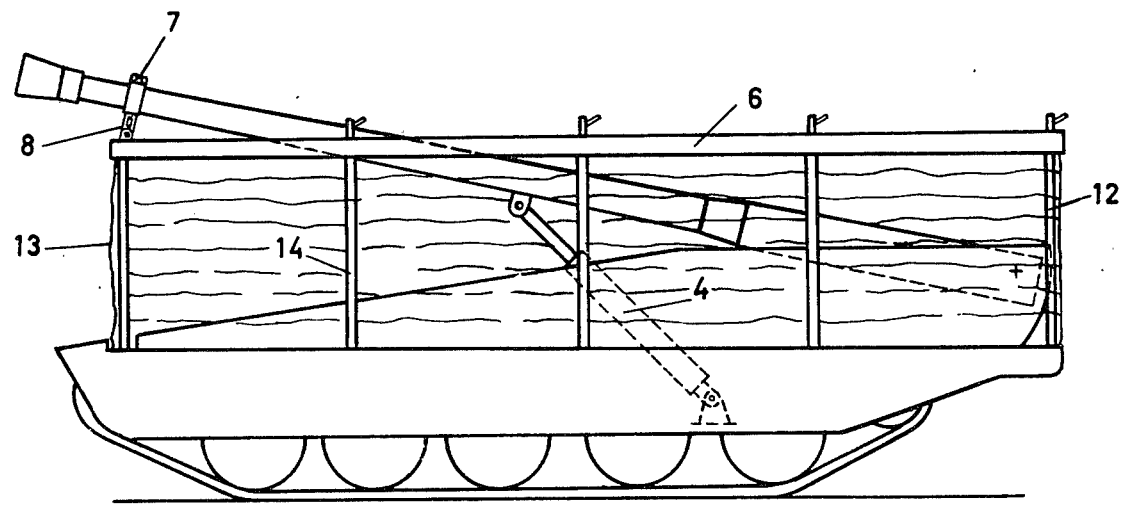

Member 7 and device 8 are to be made in such a way that when they are caused to engage with each other, the screen 10 can partly be extended by the raising of barrel 2 as shown in FIG. 3a and can be held in this raised position by means of the barrel. In addition to the member 7 and the device 8, the apparatus according to the invention also comprise two first stays in the form of two auxiliary stays 11 which, in the partly raised position of the screen according to FIG. 3a, are placed inbetween the frame 6 and the supporting surfaces 9a, 9b which are located at the central parts of the sides of the frame. The stays 11 are also designed to permit pivoting of the frame 6 around their upper ends. This pivoting has been carried out in FIG. 3b, and is performed by lowering of the barrel 2, thereby pressing down the front end of the frame via the member 7 and the device 8. In response to the pivoting movement of the frame 6 around the stay 11, the rear parts of the screen will be raised. The barrel is then held in its depressed position until other stays 12 have been placed in between the supporting surfaces and the frame at the rear portion of the screen. The front portion of the screen can thereafter be raised anew to the position according to FIG. 3c by the raising of the barrel, in which latter position third stays 13 are placed inbetween the frame and the supporting surfaces at the front portion of the frame. Said first stays 11 or the auxiliary stays can thereafter be replaced by stays 14 (two stays) which have the same height as the stays 12 and 13. Likewise, remaining stays, not shown, can be placed inbetween the frame and the supporting surfaces. The first stays 11 way be provided with a length which is approximately one-half of the length of the other stays.

Figure 4:
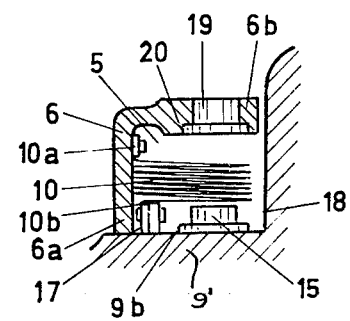
FIG. 4 is a cross-sectional view taken along section line A—A of FIG. 1 is a detailed view illustrating the operation of the parts involved in the elevation of the screen

FIG. 4 is a more detailed view of the storage space 5 for the screen 10, the upper frame 6 for the latter, and the supporting surface 9b. At the supporting surfaces, a protruding pin 15 is arranged which coacts with a recess in the stay in question, and can thus be placed over the pin. The screen is fastened to the upper frame at 10a and at the upper surface 17 of the platform 9' at 10b. As will be noted from FIG. 4, the upper frame is made with a substantially L-formed cross section, and in the retracted position of the screen the upper frame rests against said upper surface with the part 6a and against a side surface 18 of the vehicle with 6b. The frame 6 is made with a through hole 19 for the upper part of the stay in question, and with a lower guide surface 20 for a fastening nut not shown in FIG. 4, by means of which the frame can be fixed to the stay. The screen is provided with creases, so that it folds when it is retracted into the trough.

Figure 5:
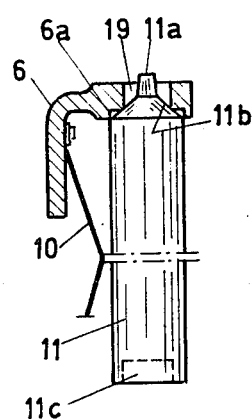

In FIG. 5, the stay 11 is inserted in the through hole 19 in the frame 6 via a stud, 11a at the upper end of the stay. At the junction to said stud the stay has a tapering, conical section 11b, against which the frame 6 rests via an edge 6c on the upper frame. In FIG. 5 the hole for the pin 15 protruding from the supporting surface is designated 11c.

Figure 6:
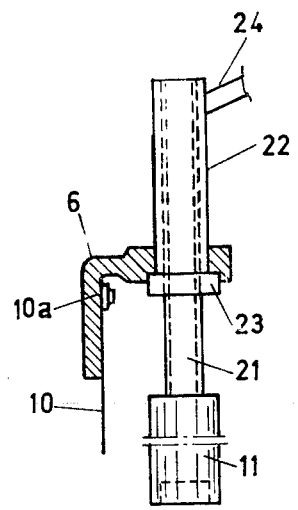
FIG. 6 is a detailed view showing the parts of figures when the screen is in the raised position.

FIG. 6 shows the fastening of the frame 6 to one of the ordinary stays (12–14) which are used for supporting the screen. In the case shown, the stay in question is provided with a threaded part 21, onto which a fastening nut 22 is screwed. Said stay, with the screwed-on nut, can be inserted from below in the hole 19 in the frame. At its lower part, the nut 22 is provided with a thickened section 23. which has an outer configuration which is adapted to the recess at the lower parts of the hole 19 so that an upper surface on the thickened section will coact with said lower stay surface 20 at the hole 19 during the final stretching of the screen.

The final stretching phase thus takes place in response to the nut 22 being screwed upwardly. This can be accomplished by means of a handle 24 which is then appropriately arranged so that it can be removed from the nut. The through hole 19 with its corresponding recess is then chosen in such a way that the fixing will take place in the transversal direction of the frame.

Figure 7:
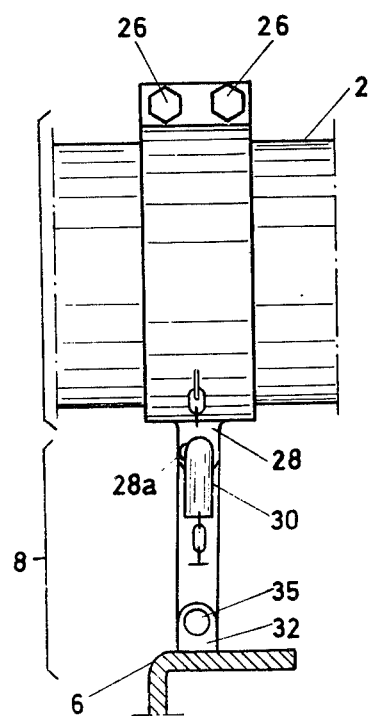
FIG. 7 in a view showing the means which connects the screen and the barrel on the vehicle.
Figure 8:
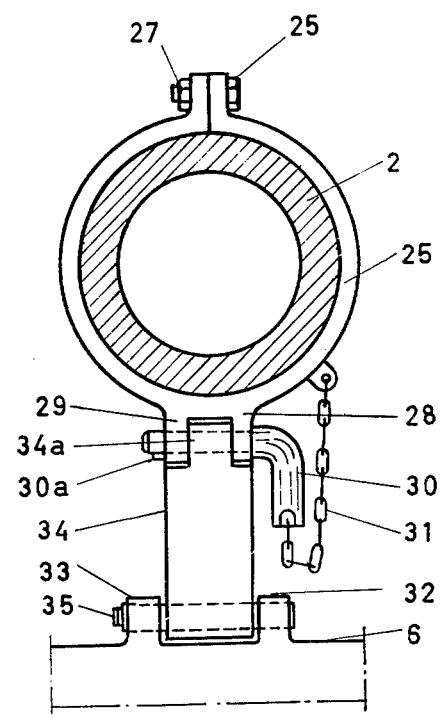
FIG. 8 shows the means according to FIG. 7, but turned 90°.

FIGS. 7 and 8 show different views of examples of the embodiment of the member 7 and the device 8. The member 7 then comprises a fastening part 25, which is made for temporary fastening onto the barrel 2.

In principle, the fastening part 25 comprises a hoop 25 which is placed around the barrel and which at its free ends is held together and fastened to the barrel by means of two screws 26 with corresponding nuts 27 at the upper side of the barrel. At the under side of the barrel, the hoop supports two protruding legs 28 and 29 in which there are holes for a securing pin 30 which is retained at the hoop 25 by means of a chain.

The device 8 comprises two bearing brackets 32 and 33 arranged at the upper frame 6, as well as a center part 34 which at one end is rotatably supported on a shaft 35 arranged at the bearing brackets. At its other end the center part 34 is provided with a section 34a which can be inserted between the legs 28 and 29 on the hoop 25, and said section 34a is also provided with a supporting hole for the pin 30. The securing pin 30 is provided, at its free end, with a stud 30a which is appropriately formed so that in certain positions to which it can be turned around its longitudinal axis, the securing pin is blocked against displacement in its longitudinal direction. The supporting holes in the legs 28 and 29 and in the section 34a are made with longitudinal grooves, of which the groove 28a is shown in FIG. 7, which grooves are arranged in such a way that when turned to a certain position, the pin 30 can be pulled out of the supporting holes. Through the embodiment shown of the member and the device, a connection is obtained between the barrel and the upper frame which permits a transferring of pulling and pushing forces from the barrel to the frame and which moreover can be adapted to the movements of the fastening points in relation to each other.

The first stays may be considered as auxiliary or temporary stays which are utilized for the raising of the screen and are placed inbetween supporting surfaces and the frame in the center of the sides of the frame. Such auxiliary stays, after the second raising of the screen at its front portion may be replaced by ordinary stays.

The invention is not limited to the embodiments shown above as examples, but can be subject to modifications within the scope of the following claims. Thus, for instance, the barrel can be made with a part integral with and coacting with the device on the frame which corresponds to the member 7 and, in principle, the device and the member can then change places.

I claim:

1. A method for selectively raising and lowering a collapsible screen which is normally stored in its collapsed state in a storage channel formed peripherally about the upper surface of a vehicle such as a tank or the like which vehicle pivotally supports therein a gun barrel, said method comprising the steps of:
   a. operatively connecting to the non-pivoted end of the barrel one end of a rigid frame to which the screen is permanently secured along its upper edge while its lower edge is secured to the vehicle's peripheral surface,
   b. raising said one end of said frame by elevating said barrel,
   c. pivotally interconnecting said frame with the upper surface of the vehicle at the midsection of the opposed longitudinal sides of the frame,
   d. lowering the barrel to thereby pivot said frame about its midsection pivotal supports to thereby raise the rear end of the frame,
   e. pivotally supporting the rear end of the frame in its upwardly pivoted position,
   f. pivoting said frame upwardly about its pivots at its rear end by again raising the barrel,
   g. and supporting the forward end of the frame in its raised position.

2. Apparatus for selectively raising and lowering a collapsible screen which is normally stored in its collapsed state in a storage channel formed peripherally along the upper surface of a vehicle such as a tank which vehicle pivotally supports thereon a gun barrel, said apparatus comprising:

a rigid frame normally stored also in said channel and having the upper peripheral edge of said screen permanently secured thereto while the bottom peripheral edge of said screen is secured to the vehicle's peripheral surface, means detachably securing said frame at a first end thereof to the free end of said barrel, a pair of temporary stays for pivotally supporting said frame at first pivot points respectively disposed on its opposed sides at their midsection and at a height for said midsection pivots as determined by the raising of said frame at its forward end in response to the raising of said barrel, a plurality of further stays for pivotally supporting said frame at its rear end at second pivot points spaced upwardly from the upper surface of the vehicle as determined by the raised position of said rear end of said frame as it is pivoted upwardly about said first pivot points by the lowering of said barrel, and a further plurality of stays for supporting said frame at its front end at support points above said vehicle's upper surface as determined by the height to which said forward end of said frame is raised in response to the raising of said barrel.

3. The apparatus of claim 2 in which said detachable securing means comprises a first member for detachably securing to said barrel, and second means which is detachably connected to said first member and pivotally connected to said frame.

4. The apparatus of claim 2 in which all said stays except said temporary stays are of the same length.

5. The apparatus of claim 4 in which said temporary stays have a length substantially equal to one-half that of the length of the other said stays.

* * * * *